Feb. 7, 1967   M. SCHLICHTE   3,303,286
CIRCUIT ARRANGEMENT FOR PULSE ENERGY TRANSMISSION
Filed Dec. 14, 1964   2 Sheets-Sheet 2

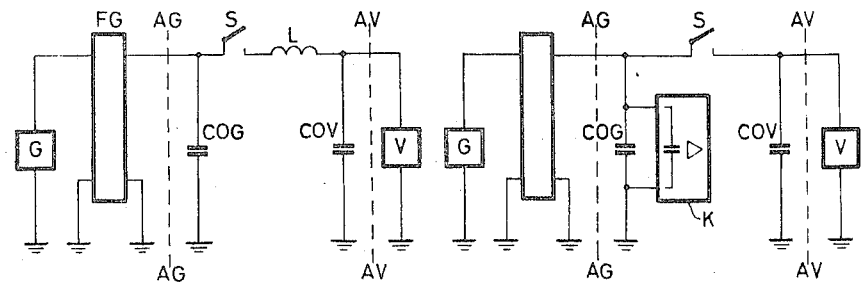
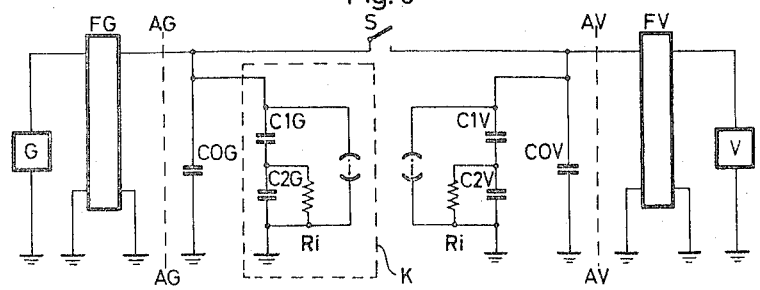
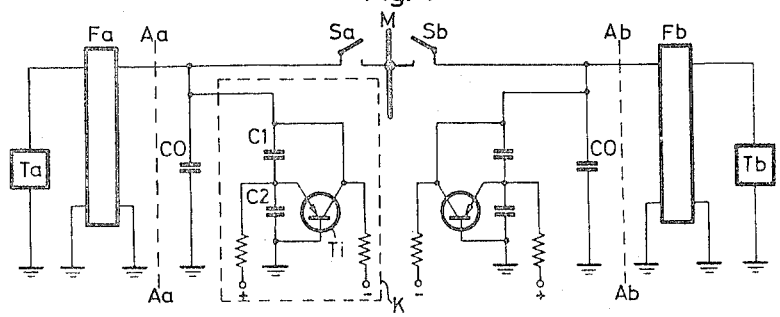
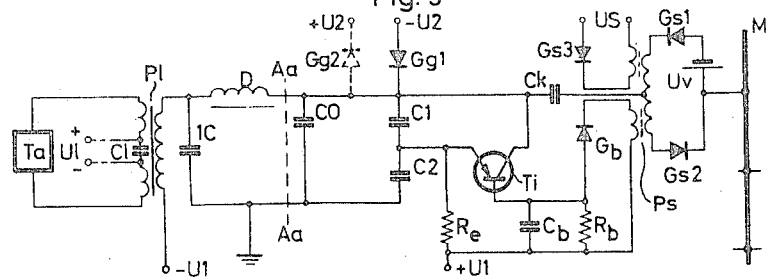

United States Patent Office

3,303,286
Patented Feb. 7, 1967

3,303,286
CIRCUIT ARRANGEMENT FOR PULSE
ENERGY TRANSMISSION
Max Schlichte, Munich, Germany, assignor to Siemens &
Halske Aktiengesellschaft, Munich, Germany
Filed Dec. 14, 1964, Ser. No. 417,970
Claims priority, application Germany, Dec. 20, 1963,
S 88,828
19 Claims. (Cl. 179—15)

Circuit arrangements for pulse energy transmission are needed for different purposes in modern electro-technology. As a rule, the energy in such systems is transmitted from one storage device, such as a shunt or cross condenser, to another similar storage device. Such circuits are employed for example as parts of impulse generators. They are also of great importance in communication systems, and particularly for time multiplex systems where they are used for the connection together of line sections or segments. Such circuit arrangements are also employed in other transmission technology, such as in multi-channel radio program transmission where the circuit arrangements can accurately distribute signals relating to, for instance, different stereo channels.

In order that losses may be reduced in the above-mentioned types of circuit arrangement, a longitudinal induction coil is normally inserted between the cross condensers. The transmission paths between the cross condensers is then closed for a particular period of time, during which time period the entire charge present on one cross condenser is transmitted to the other cross condenser during a half cycle of the resonant frequency of the circuit completed by closure of the switch. Such charge transmission is of course the energy transmission for which the circuit is designed.

In such known circuit arrangements, for proper pulse energy transmission, the switches involved must be activated for durations which are related exactly to the durations of the half cycles of the resonant frequency of the circuits formed by the switches. If the time during which the switch is closed is, for instance, too short, the energy transmission is incomplete, since part of the charge to be transmitted will remain in the originating cross condenser. On the other hand, if the operation time of the switch is too long, a reverse transmission of part of the charge previously transmitted to the load cross condenser will take place. In other words, a portion of the transmitted charge will be re-transmitted back to the originating cross condenser.

It is a particular object of the present invention to provide a circuit arrangement for pulse transmission of energy in which the switching requirements are less stringent than in the case of known circuit arrangements. This is achieved with the system of the invention for the reason that there is no particular time, such as one half cycle of the resonant frequency of the involved circuit, during which (and only during which) the switch must be closed. Moreover, it is a further object of the present invention to avoid the extreme dependency on the resistance of the switching systems, which have to be extremely small in known arrangements to avoid transmission losses, since such losses cannot be compensated for readily in such systems.

The present invention includes a circuit arrangement for pulse energy transmission employing cross condensers and is particularly designed for connection together of line segments or connections of a time multiplex telephone system. The invention is characterized by the fact that the cross condensers are provided with supplementary condensers arranged in parallel thereto. Moreover, each supplemental condenser is connected to an amplifier which is controlled in accordance with the charge being supplied to the cross condenser, and which employs its operating current source to charge the supplemental condenser. The circuit arrangement is designed in such manner that the charging time is considerably longer than the transmission time, during which the charged cross condenser is discharged. During the charging time, the supplemental condenser is charged to the same potential as the cross condenser, and that charge energy has a particular function during the energy transmission itself.

While it has been indicated that the potential at the supplemental condenser will correspond to that at the cross condenser, there may be a slight difference between these potentials by reason of a switching element provided for the supplemental condenser, or by reason of an additional constant bias potential. However, as will be shown hereinafter, such difference potential is not detrimental to the operation of the circuit arrangement.

If the supplemental condenser has a far greater capacity than the cross condenser with which it is associated, the charge transmitted to the other cross condenser will have practically the same potential as that on the cross condenser with which the said larger supplemental condenser is associated. Thus, an amount of energy will be transmitted during switch closure which corresponds to the amount of energy originally present in the originating cross condenser. Then, even if the potential present at the originating cross condenser changes between time-spaced transmissions, the other cross condenser will receive practically the same potential as that on the originating condenser.

Even if a supplemental condenser of the same capacity as the associated cross condenser is employed, the circuit arrangement of the invention may be employed advantageously, especially when both cross condensers have supplemental condensers associated therewith. In such case as will be explained hereinafter, the cross condenser receiving the charge during the transmission can be arranged to receive the same potential, and thus the same energy, as the cross condenser from which the charge originated.

In the circuit arrangement of the invention only an aperiodic charge exchange takes place between the participating condensers. As a result, the only condition that must be observed is that the time constant determinative of charge equalization is small in comparison with the duration of the closure time of the switches arranged in the transmission path. If this condition is satisfied, the activation or closure time of such switches can fluctuate considerably without noticeable hinderance to charge equalization. The charge equalization, in fact, has the same characteristic as an exponential function which converges very rapidly towards the zero level.

A particular advantage of the circuit arrangement of the present invention is that the resistance of the circuit of the transmission path only influences the time constant for charge equalization and does not influence the efficiency of the transmission. For example, if a first condenser bearing the potential U is connected by a switch to a second condenser, over a resistor, then after a sufficient period of time, both condensers have thereon the potential $U/2$, this potential being independent of the magnitude of the resistance between them. This of course is for the reason that the resistor cannot pick up a charge. As a result, the charge on the first condenser is distributed between the two condensers, undiminished by reason of the presence of a resistance in the circuit. In corresponding manner in the circuit arrangement of the invention, the resistance represented by the connecting circuit between the two cross condensers has no influence on the potentials appearing across the cross condensers connected by that circuit. Consequently, the resistance of that circuit has no influence on the efficiency of the circuit arrangement, unless it is so high as to provide a discharge time constant which is too large. As a result, in the circuit arrangement of the invention, the switches employed may furnish a resistance which need not be extremely small.

The circuit arrangement of the invention will now be more fully described in conjunction with drawings showing preferred embodiments thereof. In the drawings:

FIG. 1 is a schematic diagram showing a known type of circuit arrangement for pulse transmission of energy;

FIG. 2 is a simple representation of the circuit arrangement of the invention, arranged similarly to FIG. 1;

FIG. 3 is a schematic diagram of a modification of the apparatus of FIG. 1, also showing the amplifiers thereof in more detail;

FIG. 4 is a schematic diagram showing the utilization of apparatus similar to FIG. 3 in time multiplex systems, and wherein the amplifiers of the circuit arrangement are transistor circuits;

FIG. 5 is a schematic diagram of a further modification of the apparatus of FIG. 4, providing additional features;

Figure 6:
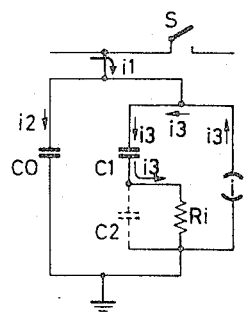
FIGS. 6–8 are partial schematic diagrams employed to explain the operation of various portions of the circuit arrangement during the charge and transmission function.

Referring first to FIG. 1, the conventional-type circuit arrangement for transmission of charges between cross condensers includes a special induction coil L connected by the switch S between the respective cross condensers C0G and C0V. The cross condenser C0G is in turn connected across the connection or terminal set AG for a remote apparatus, while the cross condenser C0V is connected across a connection AV for other remote apparatus. In the apparatus of FIG. 1 the connection AG is in turn connected to a device FG which may be a filter, and which is in turn connected across a generator G which may be employed to charge the cross condenser C0G. In turn, the cross condenser C0V is connected by the connection AV across an apparatus labeled V which may utilize the energy transferred from the condenser C0G to the cross condenser C0V.

It will be evident that if the generator G charges the condenser C0G, and the switch S is then closed, the cross condenser C0G will be discharged to cause a portion of its charge to be transferred to the cross condenser C0V, during a half cycle of the resonant frequency of the circuit. In order for the maximum charge to be transferred and not to be transmitted back to the cross condenser C0G, the switch S must be opened again precisely at the end of the half cycle of the resonant frequency. Thereafter, the charge on the condenser C0V can flow from there by way of the connection AV to the load V.

The charging of the cross condenser C0G normally takes place very slowly in comparison with the discharge time thereof during the operation of the switch S. As a result, the apparatus FG is often employed as a low pass filter and is capable of avoiding, among other things, the disturbance by the generator G of the half cycle discharge from the cross condenser C0G, when the switch S is closed. In some applications of the apparatus, a low pass filter is also employed between the connection AV and the load V.

FIG. 2 shows a very simple circuit employing the apparatus of the present invention. In that figure, it will be noted that the inductor coil L is not present, but rather that an apparatus K is connected in parallel with the cross condenser C0G, and that this apparatus contains a supplemental condenser which is connected in parallel to the cross condenser, as well as an amplifier element.

During the time that the switch S of FIG. 2 is open and the cross condenser C0G is being charged by the generator G, the potential appearing thereon of course increases. The supplementary condenser connected in parallel to this cross condenser is necessarily also supplied with energy and thus with charge, this being with the aid of the amplifier element coupled to the cross condenser. As will be disclosed more fully hereinafter, the amplifier element is so coupled to the cross condenser that it supplies a corresponding charge to the supplemental condenser, and the operation of the apparatus is such that the potential on the supplemental condenser is practically the same as that on the cross condenser. (It is assumed that there is no special bias voltage or other voltage drop which considerably changes the potential across the supplemental condenser.)

The energy for the charge of the supplemental condenser is supplied from the operating current source of the amplifier (not shown). Accordingly, there is available more energy for the later transmission, in pulse fashion, of the charge across the cross condenser C0G than these would be if there were no charged supplemental condenser. This additional energy operates during energy transmission in a manner such that the cross condenser C0V picks up more energy than would otherwise be the case. Such condition certainly exists when the energy transmission to the cross condenser occupies a very short time in comparison with the charging operation. In such case a part of the available energy from the cross condenser C0G and the associated supplemental condenser is withdrawn, without that energy having time to be transferred to other places in an undesirable fashion.

An an example, if the cross condensers C0G and C0V are of equal size, but if the supplemental condenser is large in comparison to the cross condenser, the cross condenser C0V will assume practically the same potential which originally existed at cross condenser C0G before transmission occurred. On the other hand, if there were no amplifier in the apparatus K, only half the potential on the condenser C0G would be transmitted to the cross condenser C0V. Even if the supplemental condenser is smaller than assumed in the previous example, a potential greater than half the potential originally at cross condenser C0G will appear at the condenser C0V. In either case the energy transmission is improved by use of the amplifier. In such manner no stringent demands are made on the time switching accuracy of the switch S.

Moreover, if the cross condensers C0G and C0V are not equal in size, as long as the arrangement K is provided, more energy will be transmitted to the cross condenser C0V than if the amplifier arrangement is not present. In case of such inequality, the other advantages of the circuit arrangement also remain.

It will be evident that the above-described process can be carried out repeatedly. In such fashion, the cross condenser C0V can be successively charged to different potentials by change in the potential supplied by the generator G. In consequence the load V is supplied with a potential following transmission which reflects the changing potential of the generator.

Turning now to FIG. 3, the mode of operation of the amplifier element will be more fully described. In the circuit of FIG. 3, the arrangement K is shown as supplied with a coupling condenser C2G, in addition to the supplemental condenser C1G. This coupling condenser couples the amplifier to the associated cross condenser C0G, and the coupling condenser is connected in parallel with the input of the amplifier element, the latter being represented by the input resistor R$i$. It is intended that the amplifier element employed have an input resistance which is so small that it acts as a short circuit for the associated condenser C2G during the charging of the cross condenser C0G, which takes place slowly in comparison with the speed of energy transmission. Then, practically no voltage drop occurs at the coupling condenser during the charging operation. Thus, during this charging operation of the cross condenser, there is a relatively small potential change per time unit. If, for the time being, we do not consider the input resistor of the amplifier element, the current flowing through the coupling condenser C2G would be proportional to the change in potential thereon, per time unit, and this change would change with the potential of the cross condenser. The potential change per time unit is small and as a result the current which flows over the coupling condenser is small. It follows that, because of the relative slowness of the charging process, the coupling condenser acts like a large resistor. For this reason, the above-indicated requirement, which is that the input resistor $Ri$ of the amplifier element act as a short circuit for the coupling condenser, can be met. The current flowing through the supplemental condenser C1G therefore essentially flows over the input resistor $Ri$ and thereby controls the amplifier element.

Such an amplifier is employed that a current is driven thereby to its output circuit which is almost equal to the input current. Such a current source is indicated in FIG. 3 by the symbol $i$. The current supplied by this source also feeds the input circuit of the amplifier in which the input resistor $Ri$ is located. Moreover, the current source is connected to the series circuit of supplemental condeser C1G and input resistor $Ri$. We are of course here considering only currents caused by changing potentials, which are therefore not interrupted by condensers as would be direct currents. Thus the current supplied by the source $i$ is able to compensate for the current withdrawal of the input circuit of the amplifier element by the charging of the cross condenser.

The manner in which this compensation occurs is more readily explained in detail in conjunction with FIG. 6 wherein are shown the cross condenser C0, together with the supplemental condenser C1 and the amplifier element coupled thereto by way of coupling condenser C2. This amplifier element of course also includes the input resistor $Ri$ and the current source $i$.

Coupling condenser C2 is shown in FIG. 6 in dashed line to indicate that the current $i3$ feeding the parallel circuit of the coupling condenser and the input resistor actually flows only through the input resistor $Ri$. The current $i3$ driven through the main circuit of the amplifier element by the current source can then be thought of as identical with the current flowing over the input resistor $Ri$. As a result, a single closed circuit exists, and the charging current $i1$ is not in any part supplied to the supplemental condenser but rather is employed solely for the charging of cross condenser C0. In other words, the current $i2$ flowing through the cross condenser CO is as large as current $i1$.

In referring to the charging of condensers heretofore, we have considered only an increase in charge. If the condenser C0 is being discharged, the current flowing through the cross condenser has the opposite current direction from that previously considered. Accordingly, the current flowing through the supplemental condenser C1 and the input resistor $Ri$ also has the opposite current direction. Thus, all current arrows in the partial schematic of FIG. 6 are reversed, and the supplemental condenser is simultaneously discharged. However, its discharge does not contribute to the current flowing in the outer circuit including the cross condenser. Consequently, the potential appearing at the supplemental condenser C1 always corresponds, during both charge and discharge of the cross condenser C0, to the potential across the cross condenser. However, the generator feeding the cross condenser C0 is not loaded by the adjustment of potential appearing at the supplemental condenser C1, since this adjustment is caused by operation of the amplifier. It should be realized, however, that this conclusion is valid only if the discharge process does not take place too quickly, so that the coupling condenser continues to act as a large resistor in order that no noticeable current will flow over the coupling condenser C2.

The current source $i$ of the amplifier, in accordance with the above description, must supply a current which equals the control current conveyed thereto. Consequently, the current source $i$ must drive this supplied current toward the potential which exists across the supplemental condenser C1, which can have different amplitudes. Nevertheless, the current supplied by the current source $i$ must not be dependent upon or controlled by such different amplitudes. An amplifier element having a current source of this characteristic, and furthermore having a very small input resistance, is provided by a transistor arranged in common base circuit. If an area transistor is employed, the current supplied by the current source practically equals the current flowing over the input resistor, the deviation between them being less than 2%. This small deviation does not noticeably influence the function of the circuit.

In the arrangement K of FIG. 4, a PNP transistor is utilized as the amplifier element. In this circuit the emitter to base junction of the transistor $Ti$ is connected in parallel with the coupling condenser C2, and the emitter to collector junction is connected in parallel with the supplemental condenser C1. The emitter of transistor $Ti$ is connected over an emitter resistor, to the positive pole +, and the collector is connected over a collector resistor to the negative pole —, of the operating current source. The base of transistor $Ti$ is connected to a tap in turn connected between the positive and the negative poles of the operating current source, which tap is grounded.

When the transistor is in static condition, the emitter of transistor $Ti$ is at the potential of the positive pole + of the operating current source, by way of the emitter resistor. At the same time, the base is grounded. (If an NPN transistor were employed, the poles of the operating current source would of course be exchanged.) With this arrangement, the transistor is conductive in static condition. Consequently, only very small potentials exist across condensers C1 and C2, and these potentials have practically no influence because they represent constant bias potentials which cannot alter the transmission process, by reason of the symmetry of the system in which both connections are similarly arranged and, for the same reason, initial potential G1 across the cross condenser C0 has no real effect in the equalization process. On the other hand, if the arrangement is not symmetrical, such potentials as those across condensers C1 and C2 in static operation, have effect only during the first of a series of successive energy transmissions, since charge equalization then will take place during only that first transmission. As a consequence, they are still of practically no influence. If, however, the generator feeding the cross condenser C0 can supply potentials of different polarities, care must be taken to supply a suitable bias potential source in the charge circuit of the cross condenser. An example of such an arrangement will be discussed hereinbelow.

If a number of connections are provided with these arrangements consisting of a supplemental condenser and an amplifier element coupled thereto, energy can be transmitted from and to each connection concerned. An example of such an arrangement is shown in FIG. 3 wherein the cross condenser C0G associated with the connection AG has supplemental condenser C1G, together with an amplifier element, coupled thereto. The cross condenser C0V associated with the connection has a supplemental condenser C1V and an amplifier element coupled thereto over the coupling condenser C2V. It is particularly advantageous if the entire circuit arrangement is symmetric, with the supplemental condensers equal in size to the cross condensers. Then, energy transmissions from the connection AG to connection AV. The cross condenser C0G same manner as those directed from the connection AV to the connection AG. In such case there is the further advantage that no reaction to the connections supplying the energy takes place when energy is transmitted. In other words, a transmission without reflection takes place, which is obviously desirable for such as telephone exchange systems.

The transmission of energy will now be explained in detail, assuming that such energy is directed from connection AG to connection AV. The cross condenser C0G will be charged as has been described above. Then, the switch S is closed for the transmission of energy. As a result, an energy transmission will take place in a time interval which is very short as compared to the charging time. Before this energy transmission, a charge Q will be present on the cross condenser C0G. The same charge will also be present on the supplemental condenser C1G, since practically the same potential is present at the supplemental condenser as on the cross condenser, and the potential decrease at the input resistor R$i$ can be neglected because of its minute size. As a result, during the energy transmission a charge 2Q is available for participation.

The condenser C1V and C0V are assumed to have same capacity as the condensers C0G and C1G. Moreover, the capacity of the coupling condenser C2V is assumed to be large in comparison to the capacity of these other condensers. As a consequence, by closure of switch S, two other condensers are switched in parallel to the charge condensers C0G and C1G, which together have the same capacity as do these condensers. It follows that half of the charge available travels over to these two other condensers by way of the switch S.

Figure 7:
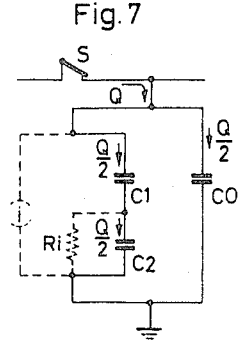

The operation is shown in FIG. 7 wherein the charge Q is conveyed to the condensers shown therein. This charge of course is distributed into the two available current branches, of which one is formed by condenser C0 and the other is formed by the connection in series of condenser C1 and C2. The capacity of both branches is practically equal, since the condensers C1 and C0 have the same capacity while the condenser C2 has a very large capacity in comparison therewith. As a result, the condenser C0 takes half of the charge conveyed thereto, this is the charge Q/2. The condenser C1 transmits the same current as the condenser C0 and therefore also takes on the charge Q/2. (It is reiterated that these currents are caused by changing potentials, so that their paths are not interrupted by condensers.)

Now if the condenser C2 also passes the same current, it must also pick up the charge Q/2. This will be the case when the capacity of the coupling condenser C2 is such that, during energy transmission the condenser acts as a short circuit for the input of the amplifier element (represented by the input resistor R$i$), considering the very short transmission time in comparison with the charging time of the cross condenser. As a result of this very short transmission time, the apparent resistance of the coupling condenser C2 is considerably smaller than during the charge time. As a result a considerably larger current than during the charge time flows over the coupling condenser C2, while in contrast only a very small current portion is channeled over the input resistor R$i$. As a matter of fact, this current portion is supplied by the current source $i$ back to the coupling condenser C2. It follows therefore that the charge Q/2 is conveyed to the coupling condenser C2, as well as to the cross condenser C1.

Figure 8:
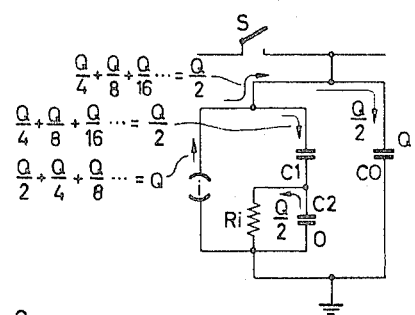

Thereafter the switch S is reopened. Now, the discharge of condenser C2 takes place over the input resistor R$i$, this discharge being governed by the time constant provided by the input resistor R$i$ and the relatively large capacity of condenser C2. The charge Q/2 flows off the input resistor R$i$. It will be appreciated that this discharge takes considerably more time than did the prior energy transmission. This process is shown in FIG. 8 wherein the currents involved are indicated. The flow of the charge over the input resistor R$i$ causes substantially the same current to be propelled from the current source through the output circuit of that source. As a result, the charge Q/2 is transported from the current source. Half of this charge flows to the cross condenser C0 and half to the supplemental condenser C1. However, the current flowing over the supplemental condenser C1 does not flow over the coupling condenser C2, but essentially over the input resistor R$i$. This is for the reason that the discharge takes place much more slowly than the energy transmission, so that the change in current per unit time is small and the input resistor R$i$ acts as a short circuit for the coupling condenser C2, as it did in the charge time of the condenser C1.

As a result, this current transmitting one half of the charge Q/2 through the input resistor R$i$ causes that current source to drive a current through the main circuit which transmits the same charge, that is charge Q/4. This charge Q/4 is again transmitted half to the cross condenser C0 and the other half to the supplemental condenser C1. The current through the supplemental condenser passes through the input resistor R$i$ transmitting the charge Q/8. As a consequence, a further charge is transmitted from the current source $i$ to the output circuit.

As this chain of reactions is followed, it will be noted that a summation charge is delivered both to the cross condenser C0 and to the supplemental condenser C1, such charge being in each case represented by the following: $Q/4 + Q/8 + Q/16 + \ldots = Q/2$. These charges add to the charges already caused to be on those condensers by reason of the energy transmission, so that each condenser now bears a charge Q. In contrast, the coupling condenser C2 is entirely devoid of charge. In such fashion the cross condenser associated with the connection supplied with energy, after completion of the transmission and then the completion of the equalization process, has picked up the same charge that had been contained in the cross condenser associated with the connection supplying the energy. That is, this cross condenser has thereon the charge Q. The consumer element or load connected with the associated connection is then supplied with energy by the charge on the cross condenser.

Turning once again to consideration of the condensers from which the energy was transmitted, it will be recalled that the charge Q was supped from these condensers during the energy transmission period. Half of this charge was transmitted from the cross condenser C0G and half from the supplemental condenser C1G. As a result, each of these condensers bears only the charge Q/2 following the transmission period. Further, it will be recalled that the coupling condenser C2G did not bear any charge at the time transmission began, for reasons which have already been described. When the supplemental condenser C1G emitted the charge Q/2, during transmission, the current transporting this charge would necessarily flow also over the coupling condenser C2G because this condenser acts as a small resistor during the short transmission time. As a result, the coupling condenser C2G is charged with the same charge Q/2. After the transmission period, the coupling condenser C2G discharges in similar fashion to the discharge of the coupling condenser C2 described in conjunction with FIG. 8. However, the sign of this charge is negative with respect to the sign of the charge of coupling condenser C2 described in conjunction with FIG. 8. As a result, a current travels through the resistor R$i$ in the reverse direction to that in the previously-examined circuit. Consequently, the amplifier causes a current of similar reverse direction to be propelled over the other two condensers C1G and G0G, and these condensers are further discharged, instead of charged. A cumulative process therefore occurs which is similar to that described in conjunction with FIG. 8, with the end result being that the cross condenser of the connection which supplies the energy for transmission is discharged.

Figure 9:
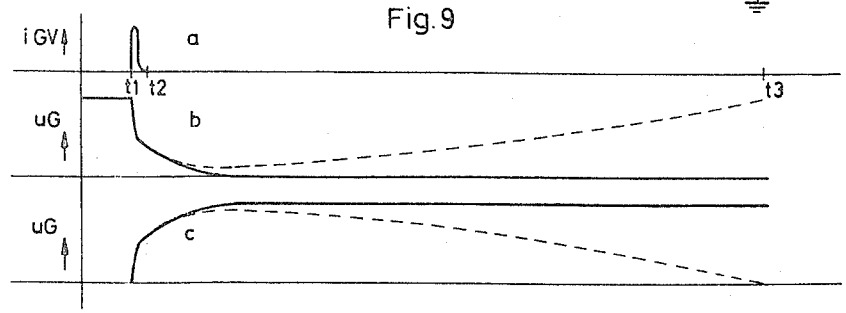
FIG. 9 is a graphical presentation of the current and charge distributions resulting from charge and transmission in the circuit arrangement of the invention.

The change of the potentials appearing at the cross condensers during the above-described processes, together with the current flowing over the switch S, are shown in FIG. 9. The curve marked $a$ indicates the current, which increases sharply at the time $t_1$ when the switch S is closed. During this steep current pulse, the charge present in the condensers of connection AG is distributed to the participating condensers. At the time $t_2$ this current pulse has dropped back to zero, since the switch S is open. The curve marked $b$ shows the change with time of the potential at the connection AG. The potential at that connection decreases at time $t_2$ to ½ of the initial value at time $t_1$. Thereafter the discharge of the coupling condenser C2G, charged negative with the charge Q2 takes place. During this discharge gradually the potential at the connection AG disappears competely and the potential of course drops off to zero, as indicated.

Curve $c$ of FIG. 9 shows the change with time of the potential at connection AV. During the time interval between $t_1$ and $t_2$ the potential increases quickly from zero to half the ultimate value thereof. Thereafter it gradually increases until the end value is reached. Of course the effect of the load V connected to the connection AV has not been considered as yet. If it is considered, the dashed line curve $c$ will then apply, by which it is shown that the potential appearing at the connection AV will at first increase and then, by discharge of the cross condenser into the load V, decrease. At time $t_3$ the cross condenser is competely discharged.

In similar manner, if the influence of the generator G is taken into consideration in its effect on the potential at connection AG, the dashed line curve $b$ will apply and the discharge of the cross condenser at that connection will cause an overlap with the charge from the generator G, so that the potential, after a temporary decrease, will gradually approach the initial value, reaching that value at time $t_3$. In the meantime, if the potential produced by the generator G has changed, this new value of the generator potential will appear at connection AG, rather than the initial value.

All of the processes described above take place with the participation of circuit elements whose qualities are independent of the size of the involved potentials and the resulting currents. These circuit elements are the condensers, the input resistors R$i$, and the current sources $i$. Therefore, without the appearance of disturbances, an exchange of charges contained in the participating cross condensers can be caused by temporary closure of the switch S. An energy transmission from connection AG to connection AV thereby overlaps with an energy transmission from connection AV to connection AG. Suitably low pass filters are provided at both connections, these filters being marked in FIG. 3 by the letters FG and FV.

If the switch S is operated periodically such as by control pulses, and for a sufficiently short period of time, then a two-way connection between the arrangements AG and AV is made, fundamental alternating potentials then being transmittable over this connection. The limiting frequency of the low pass filter has to be smaller than one-half the repetition frequency of the control pulses, for this function to occur properly. Then the circuit arrangement of the invention can be employed for the connection of line segments in such as a time multiplex telephone exchange system.

An example of this use of the invention is shown in FIG. 4 wherein the subscriber lines are connected respectively with subscriber stations T$a$ and T$b$. In order that potentials of changing polarity, that is alternating currents, may have effect at the cross condensers, a bias potential source would also be provided, this source being operative over the low pass filters F$a$ and F$b$, upon the cross condensers. An example of such a source will be described in connection with FIG. 5 hereinafter.

In operation of the apparatus of FIG. 4, energy transmissions are led over the multiplex rail M, with the connections A$a$ and A$b$ associated with subscriber stations, being connected together by the aid of the switches S$a$ and S$b$ respectively operated by control pulses. It will be evident also that other connections associated with subscriber lines can be connected to the multiplex rail M. In use of this system the switches assigned to the connections involved would be simultaneously activated periodically.

The charging procedures for the cross condensers and the supplemental condensers have been described above for the case wherein the supplemental condensers have the same capacity as the cross condensers. If they do not have the same capacity the processes nevertheless occur in fundamentally similar manner. If, for example, in the circuit arrangement according to FIG. 3, the supplemental condensers C1G and C1V have a larger capacity than the cross condensers C0G, and C0V, then the following operation takes place. The charging of the condensers from generator V then occurs in accordance with the manner already described, but the supplemental condenser C1G takes on a larger charge than previously described. Therefore, upon closure of the switch S, a larger charge than previously described is transported from the connection AG to the connection AV. By reason of the symmetry of the circuit layout, the same potential appears at the condenser of connection AV.

The supplemental condenser C1V therefore picks up a larger charge than usual, since it is assumed also to have a greater capacity than the cross condenser associated therewith. For this reason the coupling condenser C2V associated with the supplemental condenser also picks up a correspondingly greater charge. This greater charge then flows out over the input resistor R$i$ of the amplifier element in a manner similar to that described in conjunction with FIG. 8. Thus the same charge is caused to be driven by a current source $i$ associated therewith, through the associated main circuit. One part of this charge reaches the cross condenser C0V, while the other part reaches a supplemental condenser C1V and thereby flows over the input resistor R$i$. The two portions of this current are not equal, but rather the magnitudes correspond to the capacities of the cross condenser C0V and the supplemental condenser C1V, respectively. Nevertheless, the cross condenser C0V receives less than half of this charge. However, this charge itself is larger than in the case when the supplemental condenser C1V has the same capacity as the cross condenser C0V. The larger amount of charge then flows to the supplemental condenser C1V and thus also over the input resistor R$i$. This larger charge therefore causes a current to be driven by the current source $i$ over the output circuit, which current is again distributed to the cross condenser C0V and the supplemental condenser C1V. The current therefore continues to charge both condensers.

In each such charge operation, the part of the charge supplied by the current source $i$ which does not reach the cross condenser C0V immediately, but rather reaches the supplemental condenser C1V, necessarily flows over the input resistor R$i$ and thus causes a current to be propelled from the current source through its output circuit. Consequently, the entire charge supplied originally by the current source $i$ eventually reaches the cross condenser C0V. This is the charge which originally was located on coupling condenser C2V. In the case here considered, however, it is larger than in the case where the supplemental condenser C1V has the same capacity as the cross condenser C0V.

As a result, a greater charge than otherwise reaches the cross condenser C0V and accordingly a greater potential than usual appears across this condenser. This means that in the course of energy transmission amplification has taken place. The energy amplification is of course proportional to the relation of the capacity of the supplemental condenser to the capacity of the cross condenser. This amplification is desirably utilized to compensate for energy losses occurring in transmission with the circuit arrangement. If this be done, the capacity of the supplemental condensers as compared to the capacity of the cross condensers must be increased by just the amount necessary to equalize the energy losses. Of course it will be evident that if the supplemental condensers have a smaller capacity than the cross condensers, a negative amplification will occur.

It might be useful at this point to summarize the characteristics of the circuit arrangement designated K in FIGS. 3 and 4. If this arrangement is fed in a manner such that the potential thereacross changes only very little with respect to time (that is, a slow charging operation takes place), only the cross condenser associated therewith acts as a load on the generator. On the other hand, if a relatively fast charge process occurs, both the cross condenser and the supplemental condenser act as loads. This operation of course corresponds to energy transmission. The charge picked up from the supplemental condenser hereafter is further carried, by the effect of the amplifier element, from the supplemental condenser into the cross condenser.

If the arrangement K together with the cross condenser pertaining thereto, itself acts as a charge source, then during the slow discharge only the charge contained in the cross condenser is discharged (as by discharge into the load). During quick discharge, however, the charge contained in the cross condenser acts together with that contained in the supplemental condenser, as an energy transmission. Thereupon the supplemental condenser is completely discharged. In such case the supplemental condenser is completely discharged as is the associated cross condenser of equal size. In the case of one way transmission with amplification it is suitable to provide the supplemental condenser with a greater capacity than the cross condenser, but only at the connection which is fed by the energy transmission. In such case both condensers receive a greater charge during energy transmission than would otherwise be the case. The charge contained in the supplemental condenser is then also carried into the cross condenser due to the effect of the amplifier element, so that the cross condenser necessarily picks up a greater charge than if the supplemental condenser were not larger than the cross condenser.

Referring now to the circuit arrangement of FIG. 5, the subscriber station T$a$ can be connected with the multiplex rail M over the circuit arrangement shown therein. It will be evident that other subscriber stations (not shown) can be connected also with this multiplex rail. The cross condenser C0 in the circuit of FIG. 5 is connected across the connection A$a$ of the subscriber line leading to the subscriber station T$a$. Further, the supplemental condenser C1 and the coupling condenser C2 are connected in series across the cross condenser C0. The transistor T$i$ acts as the amplifier and has an emitter resistor R$e$ to which the positive potential +U1 is connected. The collector of the transistor is connected over a choke D and a winding of the repeater P1 to the negative potential —U1. The combination of the choke D with the cross condenser C0, and the condenser 1C provides a low pass filter for the apparatus. The alternating speaking voltages are connected to this low pass filter from the subscriber station T$a$ by way of the repeater P1, so that the circuit arrangement to be further described may transmit the speaking voltages by way of the multiplex line M to another like circuit arrangement connected with another subscriber station. The second circuit arrangement, however, is not shown in FIG. 5, but its construction will be obvious from the construction shown therein.

The circuit arrangement so far described is such that the condensers C0 and C1 bear charges even when the arrangement is not being employed to connect speaking voltages to the multiplex rail. This is achieved through connection of the negative potential —U1 to these condensers, so that the condensers necessarily bear bias voltages which are increased and decreased under the influence of the alternating speaking voltages. In this fashion energy transmission can take place over the circuit arrangement in accordance with the momentary values of these alternating voltages.

A limiting diode G$g$1 is connected between the ungrounded terminal of the cross condenser and a negative potential —U2, which is slightly more negative than the negative potential —U1. This is for the purpose of limiting the negative potentials appearing at the cross condenser. On the other hand, in order to limit the positive potentials which may appear at the cross condenser C0, a limiting diode G$g$2 may also be provided and connected to the positive potential ±U2, which is slightly more positive than ground. Nevertheless, the function of the second limiting diode can be taken over by the transistor T$i$, since the collector to base junction of this transistor is present in the circuit with the proper polarity of bias, and the limiting function can therefore be fulfilled by the collector to base junction.

It will be evident that a second circuit would be simultaneously connected to the multiplex rail M at the same time that the subscriber's station T$a$ was connected to that multiplex rail. The respective low pass filters would then be operative to filter the voice conversations transmitted from one station to the other, so that these alternating speaking voltages would reach the subscriber's stations connected to the multiplex rail at the same time.

The subscriber station T$a$ of course will employ a direct current supply which includes a voltage source U1. The direct current from that source therefore will flow over the primary winding of the repeater P1, resulting in a magnetic flux and a bias magnetization of the repeater. Such bias magnetization is undesirable since it interferes with the transmission qualities of the circuit. In the circuit arrangement of FIG. 5, this bias magnetization and the associated magnetic flux are compensated by the current supplied by the potentials —U1 and +U1 connected to the transistor T$i$, causing a constant static current to flow over the secondary winding of the repeater P1. The winding sense of the respective primary and secondary windings may of course be arranged such that the two static currents compensate for each other with the result that there is no bias magnetization on open circuit with the subscriber station not in operation. It will be evident that the direct current through the primary winding of the repeater P1 need be compensated for only when the receiver is lifted at the subscriber station, since the bias current circuit is incomplete until that operation takes place. In a time multiplex exchange system of the type indicated by FIG. 5, the switch assigned to the subscriber station may be periodically operated by control pulses so that the energy transmissions necessary for the connection can take place. This arrangement can be employed to cause the transistor T$i$ to conduct its static current only during this time period. That is, the current flowing through the transistor T$i$ to compensate for the static bias caused by the current through the primary of the repeater coil P1, can be caused to flow only when the associated switch is operated.

For the purpose of activating the transistor circuit, control impulses may be coupled into the circuit over the repeater P$s$, the control pulses being indicated by the letters US and being coupled into the repeater through the rectifier G$s$3. The secondary winding of the repeater is connected over a rectifier G$b$ to the parallel combination of a resistor R$b$ and a condenser C$b$. This R-C combination serves as a storage device and is connected in the base circuit of the transistor T$i$. That is, the potential +U1 is connected over the resistor R$e$ to the emitter of transistor T$i$, and also to the base of the transistor over the resistor R$b$. When the control pulses are not available, the transistor T$i$ is off, since the same potential +U1 is present on both the base and the emitter. However, when a control pulse appears, a current is caused thereby to flow over the resistor R$b$ in a sense such as to make the base more negative than the emitter, and the transistor is rendered conductive. The condenser C$b$ is charged by this current and the time constant is such that the condenser discharges very little between pulses, so that the potential thereon keeps the transistor T$i$ conductive so long as the impulses continue. Upon cessation of the control pulses, the condenser C$b$ discharges and the transistor T$i$ is again turned off.

The repeater P$s$ also is employed as a part of an electronic switch which is operative to switch the connection A$a$ to the multiplex rail M. This repeater has a tertiary winding whose respective ends are connected together over rectifiers G$s$1 and G$s$2, in series with a bias source U$v$. The junction between the bias source U$v$ and the rectifier G$s$2 is connected to the multiplex rail. This bias source is operative to prevent current flow through the tertiary winding of the repeater P$s$ under normal conditions. However, the connection A$a$ is connected over the blocking condenser C$k$ to the center tap of the tertiary winding.

As long as the rectifiers G$s$1 and G$s$2 are biased off, no energy transmission can take place from the connection A$a$ over the multiplex rail, and of course no energy can be transmitted in the reverse direction. However, when a control pulse US appears, a potential pulse is induced in the tertiary winding to cause a current to flow through the rectifiers G$s$1 and G$s$2 in the direction of transmission. Then, energy transmission can take place to and from the connection A$a$. This control pulse however does not effect the operation of the circuit arrangement in any other manner.

It will be evident that many minor changes could be made in the apparatus described hereinabove without departure from the scope of the invention. Accordingly, the invention is not to be considered limited to the specific embodiments disclosed herein, but rather only by the scope of the appended claims.

I claim:

1. A circuit arrangement for pulse energy transmission including a pair of cross condensers between which the energy is transmitted, means for charging at least one of said cross condensers during the intervals between pulse transmissions, and pulse-operated switch means for connecting the cross condensers to each other,
   the improvement comprising a supplemental condenser connected across at least one of said cross condensers, and amplifier means connected to said one cross condenser and operative during intervals between pulse operation of said switch means to supply the supplemental condenser with a charge corresponding to that on the cross condenser.

2. The apparatus of claim 1 including a coupling condenser connected across the input of said amplifier means and in series with said supplemental condenser across said one cross condenser.

3. The apparatus of claim 2 in which the liquid resistance of said amplifier means is so low that it acts as a substantial short circuit for said coupling condenser during the intervals between pulse transmissions, the pulse transmissions being very short in comparison with the intervals therebetween, said amplifier means being operative to furnish a current to the supplemental condenser substantially equal to the current flowing through its input resistance, so that no substantial energy is taken from said charging means by the supplemental condenser during said intervals.

4. The apparatus of claim 3 in which said coupling condenser has a capacity large enough that it functions substantially as a short circuit for the input resistance of said amplifier means during pulse transmissions.

5. The apparatus of claim 4 in which the capacity of said coupling condenser is much larger than the capacity of its associated supplemental condenser.

6. The apparatus of claim 5 in which said amplifier means includes a transistor whose emitter to base junction is connected in parallel with said coupling condenser and whose emitter to collector junction is connected in parallel with said supplemental condenser.

7. The apparatus of claim 6 in which the supplemental condenser has substantially the same capacity as its associated cross condenser.

8. The apparatus of claim 6 in which the supplemental condenser has a greater capacity than its associated cross condenser.

9. The apparatus of claim 2 in which said amplifier means includes a transistor whose emitter to base junction is connected in parallel with said coupling condenser and whose emitter to collector junction is connected in parallel with said supplemental condenser.

10. In a circuit arrangement for pulse energy transmission including a pair of cross condensers between which the energy is transmitted, means for charging at least one of said cross condensers during the intervals between pulse transmission, and pulse-operated switch means for connecting the cross condenser to each other for energy transmission therebetween during pulse durations which are short in comparison with the intervals therebetween,
    the improvement comprising a separate supplemental condenser connected across each of said cross condensers,
    and separate amplifier means connected to each cross condenser and operative during said intervals between pulse durations to supply the associated supplemental condenser with a charge corresponding to that on the cross condenser.

11. The apparatus of claim 10 including a separate coupling condenser connected across the input of each said amplifier means and in series with the associated supplemental condenser across the associated cross condenser.

12. The apparatus of claim 11 in which the input resistance of each said amplifier means is so low that it acts as a substantial short circuit for said coupling condenser during said intervals between pulses, said amplifier means each being operative to furnish a current to the associated supplemental condenser substantially equal to the current flowing through its input resistance.

13. The apparatus of claim 12 in which said cross condenser has a capacity large enough that it functions substantially as a short circuit for the input resistance of the associated amplifier means during pulse transmissions.

14. The apparatus of claim 13 in which each said amplifier means includes a transistor whose emitter to base junction is connected in parallel with the associated coupling condenser and whose emitter to collector junction is connected in parallel with the associated supplemental condenser.

15. In a time multiplex exchange system including a multiplex rail and connections for line segments connectable to said rail by respective pulse-operated switches for pulse durations short in comparison with the intervals therebetween, the improvement comprising
    a separate cross condenser connected across each said connection and operable to store a charge responsive to the voltage across the associated line segment,
    a separate supplemental condenser connected across each of said cross condensers,
    and separate amplifier means connected to each cross condenser and operative during said intervals between pulse durations to supply the associated supplemental condenser with a charge corresponding to that on the cross condenser.

16. The apparatus of claim 15 in which said switches are each operative to connect the associated connection to the multiplex rail upon transmission of a voltage pulse thereto, and in which the apparatus includes a separate low pass filter connected between each cross condenser and the associated line segment and having a limiting frequency smaller than half the repetition frequency of the voltage pulses applied to the associated switch, and a separate coupling condenser large in comparison with the associated supplemental condenser connected across the input resistance of each amplifier means.

17. The apparatus of claim 16 in which each line segment is connected by a repeater to a direct-current operated subscriber set, so that a bias current flows in the primary of the repeater, and said amplifier means each includes a transistor and an operating current source therefor connected to the secondary winding of said repeater in such fashion as to drive a compensating static current therethrough to compensate for the magnetic bias on the repeater due to the bias current.

18. The apparatus of claim 17 in which each said transistor is normally biased off so that no compensating current flows when the subscriber set is not in operation, but including means for biasing the transistor on when one of said voltage pulses is received by the associated switch, said biasing means being operative to keep the transistor biased on between repetitive voltage pulses.

19. The apparatus of claim 18 in which the transistor of each said amplifier means has its emitter to base junction connected across the associated coupling condenser and its collector to emitter junction connected across its associated supplemental condenser.

References Cited by the Examiner

UNITED STATES PATENTS 3,117,185  1/1964  Adelaar _____ 179—15

ROBERT L. GRIFFIN, *Acting Primary Examiner.*